US010210448B2

(12) United States Patent
Gibson et al.

(10) Patent No.: US 10,210,448 B2
(45) Date of Patent: Feb. 19, 2019

(54) CHIPLESS RADIO FREQUENCY IDENTIFICATION (RFIT) FOR TAMPER EVIDENCE

(71) Applicant: XEROX CORPORATION, Norwalk, CT (US)

(72) Inventors: George A. Gibson, Fairport, NY (US); Wayne A. Buchar, Bloomfield, NY (US); John P. DiVincenzo, Fairport, NY (US); Brendan C. Casey, Webster, NY (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 15/154,761

(22) Filed: May 13, 2016

(65) Prior Publication Data

US 2017/0330066 A1 Nov. 16, 2017

(51) Int. Cl.
*G06K 19/073* (2006.01)
*G08B 13/24* (2006.01)
*G06K 19/067* (2006.01)

(52) U.S. Cl.
CPC ... *G06K 19/07372* (2013.01); *G06K 19/0672* (2013.01); *G06K 19/073* (2013.01); *G08B 13/2417* (2013.01)

(58) Field of Classification Search
CPC ........... G06K 19/07798; G06K 7/0008; G06K 19/0723; G06K 19/07749; G08B 13/02; G08B 13/1436; G08B 13/1445; G08B 13/149; G06Q 10/08; G06Q 10/087
USPC ....... 340/539.31, 572.1, 572.3, 572.4, 572.5, 340/572.6, 572.7, 572.8, 572.9
See application file for complete search history.

(56) References Cited

U.S. PATENT DOCUMENTS

| | | | |
|---|---|---|---|
| 6,794,000 B2 | 9/2004 | Adams et al. | |
| 7,095,324 B2 | 8/2006 | Conwell et al. | |
| 7,170,409 B2 | 1/2007 | Ehrensvard et al. | |
| 7,377,447 B2 | 5/2008 | Oberle | |
| 7,800,504 B2 | 9/2010 | Teeter | |
| 8,274,389 B2 | 9/2012 | Teeter | |
| 8,963,712 B2 | 2/2015 | Mullis et al. | |
| 8,963,714 B2 | 2/2015 | Medhal et al. | |
| 9,121,195 B2 | 9/2015 | Mullis et al. | |
| 9,734,446 B2* | 8/2017 | Gibson | G06K 19/07773 |
| 2003/0031819 A1* | 2/2003 | Adams | G06K 19/073 428/40.1 |
| 2005/0242957 A1* | 11/2005 | Lindsay | G06K 19/0716 340/572.7 |

(Continued)

*Primary Examiner* — Hai Phan
*Assistant Examiner* — Anthony D Afrifa-Kyei
(74) *Attorney, Agent, or Firm* — MH2 Technology Law Group LLP (57) ABSTRACT

A radio frequency identification (RFID) tag or transponder that outputs a first signal when a product or product package is sealed. During one particular use, unsealing the product or product package disables the RFID tag, such that no active second signal is output (i.e., the second signal is a passive second signal). In another particular use, unsealing the product or product package removes one or more resonators of a multiresonator such that the second signal is an active second signal that is different from the first signal. The RFID tag need not be visible to identify whether the product or product package is in a sealed state or an unsealed state.

4 Claims, 7 Drawing Sheets

(56) References Cited

U.S. PATENT DOCUMENTS

| | | | | |
|---|---|---|---|---|
| 2006/0109130 A1* | 5/2006 | Hattick | ............... | G06K 19/045 340/572.7 |
| 2006/0255953 A1* | 11/2006 | Lyon | ..................... | B65D 55/02 340/572.8 |
| 2007/0207284 A1* | 9/2007 | McClintic | ................. | B32B 7/12 428/40.1 |
| 2008/0157975 A1* | 7/2008 | White | .................... | B65D 55/02 340/572.7 |
| 2015/0069133 A1* | 3/2015 | Qian | ..................... | G06K 19/02 235/492 |
| 2015/0076235 A1* | 3/2015 | Qian | ................. | G06K 19/0672 235/492 |

* cited by examiner

CHIPLESS RADIO FREQUENCY IDENTIFICATION (RFIT) FOR TAMPER EVIDENCE

TECHNICAL FIELD

The present teachings relate to the field of product packaging and, more particularly, to tamper-evident product packaging.

BACKGROUND

Radio frequency identification (RFID) technology has become increasingly commonplace for use in inventory tracking, loss prevention, and other uses. An RFID system may include a transponder or tag that is placed on an object and an interrogator or reader that wirelessly receives information transmitted by the tag. RFID tags may be broadly classified as active tags that include a local power source such as a battery, or passive tags that are activated by electromagnetic waves generated by the reader that induce a current in an antenna within the tag.

RFID tags can include an electronic circuit that may be in the form of an chip or integrated circuit (IC). The chip may store data that is communicated to the reader. In contrast, a chipless RFID tag has neither an integrated circuit nor discrete active electronic components, and may be printed directly onto a substrate resulting in a lower cost than a chipped RFID tag.

A chipless RFID tag may include a receive antenna that intercepts interrogator output, a transmit antenna that broadcasts data that is received by the interrogator, and a plurality or array of resonators (i.e., a multiresonator) electrically coupled between the receive antenna and the transmit antenna. During use, the reader may output a broad band or spectrum of radio frequencies. Depending on the configuration of the multiresonator, one or more of the radio frequencies may include a frequency-dependent antenna load that is intercepted by the receive antenna and causes the multiresonator to resonate. The resonation modifies the signal that is transmitted by the transmit antenna and may be received by the interrogator. Each RFID tag may be encoded by etching a conductive film to result a specific set of patterned resonant structures that form the multiresonator. For unique identification of a particular tag from a set of tags, each transponder must be made to include a unique multiresonator design, which is an expensive process.

The receive antenna, the transmit antenna, and resonators may be prepared using one or more patterning techniques to pattern a conductive layer, for example a metal layer. Various patterning techniques may be used, for example, stamping, chemical etching, mechanical etching, laser etching, direct writing of a metal layer, vapor deposition, etc.

As a practical matter, RFID technology uses radio frequencies that have much better penetration characteristics to material than do optical signals, and will work under more hostile environmental conditions than bar code labels. Therefore, the RFID tags may be read through paint, water, dirt, dust, paper, human bodies, concrete, or through the tagged item itself. RFID tags may be used in managing inventory, automatic identification of cars on toll roads, security systems, electronic access cards, keyless entry and the like.

Tamper-evident product packaging assists in the identification of unwanted or unauthorized entrance into a package. These packaging enhancements help to reduce or prevent counterfeiting and adulteration of foods, medicines, and other products. Current technologies for tamper-evident packaging include the use of paper tape seals, tamper-evident rings with bridge seals, twist-off crowns, heat-shrinkable polymer cap seals, foil overwraps, cork finish, etc. These tamper-evident structures may be effective but require direct visual inspection (e.g., line of sight) of the seal to determine whether the product has been opened and potentially adulterated. Additionally, counterfeit seals that are a convincing replacement for an original seal may be produced. As an alternative to paper or polymer seals, electronic methods for tamper-evident pharmaceutical packaging can include auditory alarms that sound when a product has been opened. While effective, electronic tamper-evident methods are also expensive.

A low-cost and effective tamper-evident packaging that does not require direct visual inspection of the seal and avoids various other problems with conventional tamper-evident packaging would be a welcome addition to the art.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

An embodiment of a tamper-evident seal according to the present teachings may include a radio frequency identification (RFID) transponder comprising a carrier and a plurality of resonators positioned over the carrier, a sealed state, wherein the RFID transponder is configured to output a first response to an interrogation when the tamper-evident seal is in the sealed state, and an unsealed state, wherein the RFID transponder is configured to output a second response to an interrogation when the tamper-evident seal is in the unsealed state, the second response being different than the first response.

BRIEF DESCRIPTION OF THE DRAWINGS

The accompanying drawings, which are incorporated in, and constitute a part of this specification, illustrate embodiments of the present teachings and, together with the description, serve to explain the principles of the disclosure. In the figures.

It should be noted that some details of the FIGS. have been simplified and are drawn to facilitate understanding of the present teachings rather than to maintain strict structural accuracy, detail, and scale.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same or like parts.

As used herein, unless otherwise specified: the term "chipless" describes an RFID transponder that has neither an integrated circuit nor discrete electronic components, such as a transistor or coil; the term "resonator" or "resonant structure" refers to a structure having an associated resonance corresponding to a characteristic frequency; the term "spectral signature" refers to at least one identifying resonance associated with an applied excitation frequency; the term "tag" refers to a transponder or a combination of a transponder and other structures that may include a carrier on which the transponder is disposed or device package within which the transponder is disposed. An RFID tag may be attached to an article; the term "transponder" refers to a device such as an RFID tag that receives one or more signals or "chirps," such as those transmitted by an interrogator or "RFID reader," and sends one or more response signals (e.g., a reflected signal or a reemitted signal) in response to the received signals; the term "etched" refers to a process by which portions of a material are removed, such as a chemical etch, a mechanical etch, a laser etch or ablation, etc.; the term "security overlayer" refers to a layer that, when tampered with, damages, destroys or otherwise modifies a structure on which the security overlayer is disposed; the term "generic RFID transponder" means an RFID transponder that has an associated resonant structure for each frequency domain applied by a transmitter, such as an interrogator.

An embodiment of the present teachings results in a physical change in the design or form factor of an RFID tag. In one embodiment, the physical change is disruptive or destructive in which opening the container disables one or more resonant structure of the RFID tag, such as one or more resonator of a multiresonator. This embodiment may include complete disruption of the RFID tag so that it no longer responds to an interrogation. This embodiment may also include alteration of the RFID tag so that it outputs a first response prior to opening the package and outputs a second response after opening the package, where the first response is different than the second response. In another embodiment, the physical change is additive in which opening the container enables one or more resonant structure of the RFID tag, such as one or more resonator of a multiresonator. Either case results in a change in an output of the RFID tag in response to an interrogation.

Figure 1:
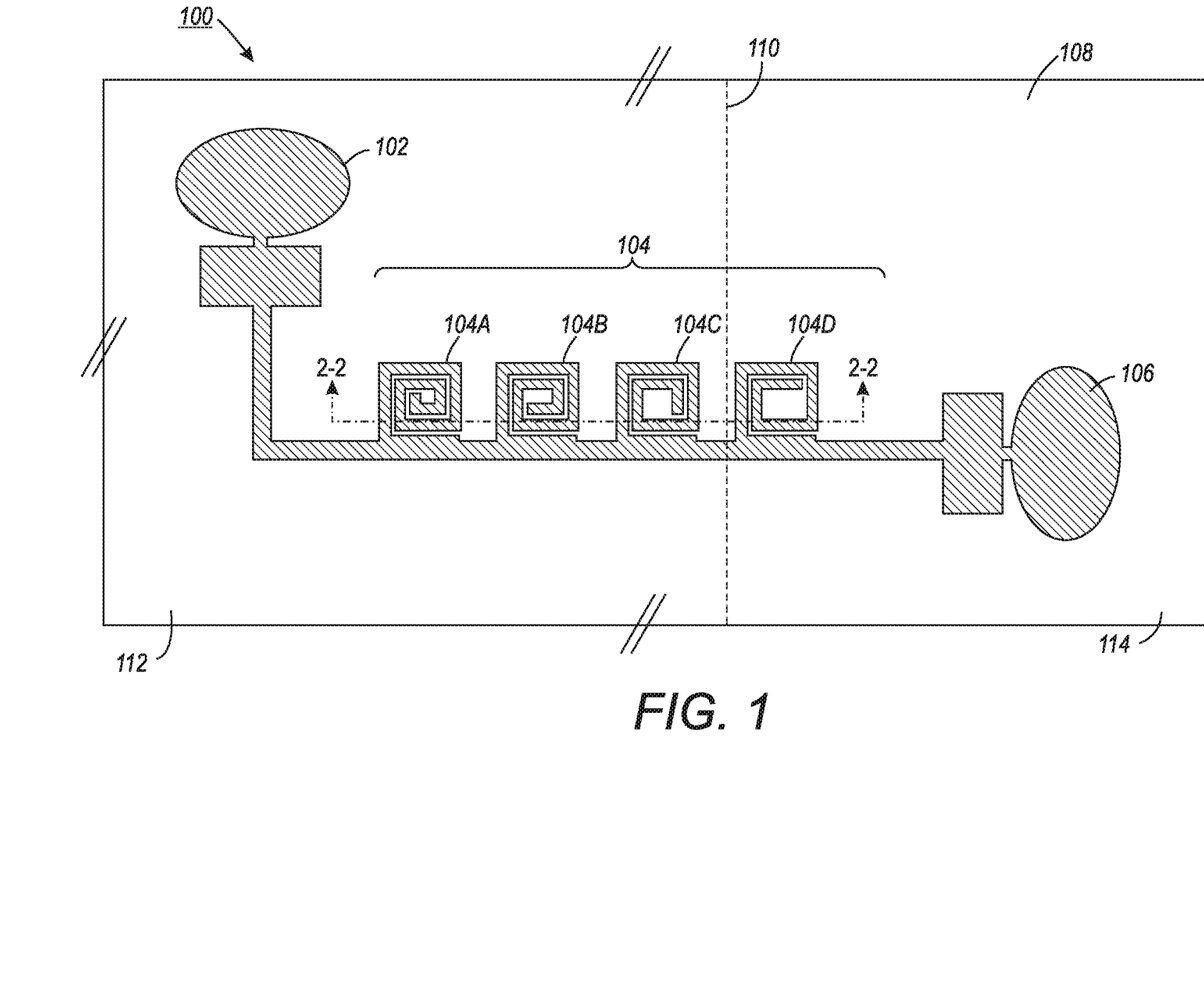
FIG. 1 is a plan view of a radio frequency identification (RFID) tag in accordance with the present teachings.
Figure 2:
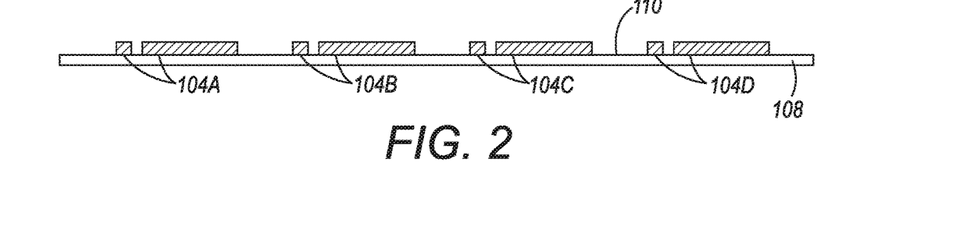
FIG. 2 is a cross section along 2-2 of FIG. 1.

FIG. 1 is a top view, and FIG. 2 is a magnified cross section along 2-2 of FIG. 1, depicting a portion of an RFID tag or transponder 100. Transponder 100 can include a receive antenna 102, a multiresonator 104 including a plurality of resonators 104A-104D, and a transmit antenna 106. As depicted in FIG. 1, each resonator 104A-104D has a unique spiral pattern that causes each resonator to resonate at a different frequency. It will be appreciated that an RFID tag can include other structures that are not depicted for simplicity, while various depicted structures may be removed or modified.

In use, the interrogator outputs a broad spectrum of frequencies that may be received by the receive antenna 102, and that may cause one or more of the resonators 104A-104D to resonate. The number of resonators 104A-104D that resonate and the amplitude at which they resonate results in an output frequency that is translated into an analog signal that is transmitted as a response signal by the transmit antenna 106 to the interrogator. For example, and without limitation to the frequencies specified, resonator 104A may resonate at 2.97 gigahertz (GHz), resonator 104B may resonate at 2.66 GHz, resonator 104C may resonate at 24 GHz, and resonator 104D may resonate at 24.3 GHz. Because the analog signal generated during an interrogation and transmitted by the transmit antenna 106 is unique to the specific tag from a plurality of tags as a result of the unique pattern of resonators 104A-104D, the interrogator can identify the specific tag from the plurality of tags. The transponder 100 may be disposed on a carrier 108 such as directly on an article or on an intermediate adhesive backing for attaching onto an article. The carrier 108 may be a substrate on which the RFID transponder is initially fabricated or may be a carrier on which an RFID transponder is transferred onto after it is fabricated. A carrier 108 having an adhesive backing may allow the RFID transponder to be easily attached (i.e., tagged) onto an article.

In this embodiment, the carrier 108 includes a shear-sensitive zone 110, for example, a perforated seam through the carrier, a thinned region of the carrier, a combination thereof, or another type of shear-sensitive zone that forms a weakened seam. The shear-sensitive zone allows a first carrier portion 112 to be more easily physically and electrically separated from a second carrier portion 114 along the shear-sensitive zone 110. In this embodiment, the first carrier portion 112 has a first portion of the resonators 104A-104D attached thereto, specifically resonators 104A-104C, as well as the receive antenna 102. The second carrier portion 114 has a second portion of the resonators 104A-104D attached thereto, specifically resonator 104D, as well as the transmit antenna 106. The shear-sensitive zone further allows the first portion of the resonators 104A-104C to be more easily physically and electrically separated from the second portion of the resonators 104D. Additionally, the shear-sensitive zone allows the receive antenna 102 to be more easily physically and electrically separated from the transmit antenna 106.

Figure 3:
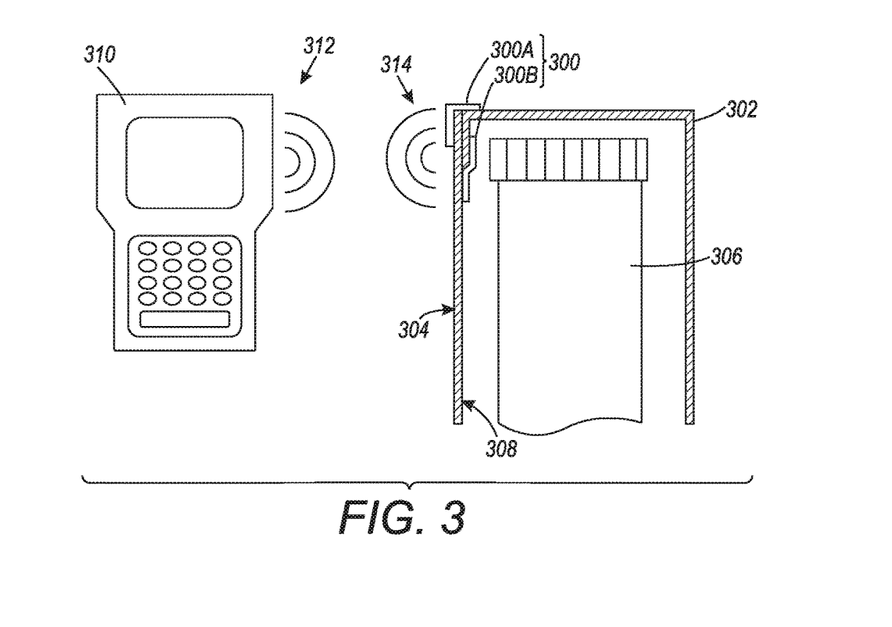
FIG. 3 is a side view of a sealed package or package product including an RFID tag during use in accordance with the present teachings.

An RFID transponder similar to RFID transponder 100 of FIGS. 1 and 2 may be physically connected to a product package or a product itself. For example, FIG. 3 depicts at least one transponder 300 attached to a product package 302. While FIG. 3 depicts a first transponder 300A and a second transponder 300B attached to the product package 302 for purposes of illustration, a product package 302 will typically include either the first transponder 300A or the second transponder 300B, although the use of both transponders 300A, 300B is contemplated.

As depicted in FIG. 3, the first transponder 300A is attached to an external surface 304 of the product package 302, where the external surface 304 is visually exposed while a product 306, such as pill vial holding one or more pills as depicted, or another product, is sealed and/or stored within the product package 302. The second transponder 300B is attached to an internal surface 308 of the product package 302, where the internal surface 308 is not visually exposed while the product 306 is sealed and/or stored within the product package 302. The transponders 300A, 300B may be attached to the product package 302 using, for example, a pressure-sensitive adhesive (not depicted for simplicity).

In the FIG. 3 embodiment, prior to opening the product package 302, an interrogator (RFID reader) 310 outputs an interrogation or chirp 312 which is received by the transponder 300. In response to the interrogation 312, the transponder 300 outputs a response 314 that is received by the interrogator 310. Thus the response 314 from the RFID tag 300 suggests that the tamper-evident seal of the product package 302 has not been opened or tampered with (i.e., is in a sealed state). As depicted, in contrast to some conventional tamper-evident seals, the transponder 300, and more particularly the second transponder 300B, need not be visually inspected or visible to determine whether the tamper-evident seal of the product packaging 302 has been opened (i.e., is in an unsealed state or has a broken seal).

Figure 4:
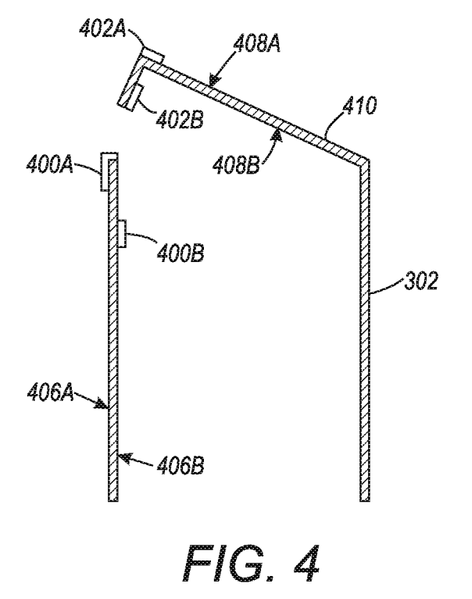
FIG. 4 depicts the FIG. 3 structure after opening the package or package product.

As depicted in FIG. 4, opening the product package separates the carrier 108 (FIGS. 1 and 2) of each transponder 300A, 300B along the shear-sensitive zone 110 (FIGS. 1 and 2) into at least a first carrier section 400A, 400B and a second carrier section 402A, 402B. As depicted, the first carrier section 400A, 400B is physically attached to a first surface of the product or product package (hereinafter, collectively, "product") 302, for example an exterior sidewall 406A or and interior sidewall 406B, while the second carrier section 402A, 402B is attached to a second surface such as an exterior surface 408A or an interior surface 408B of a lid 410. When the first surface is moved relative to the second surface, the first carrier section of the carrier physically and electrically separates from the second carrier section. The shear-sensitive zone 110 provides a weakened seam through the carrier 108, and ensures that the carrier 108, and the electrically active portions of the transponder 100, separate at a desired location. Separating the carrier 108 also physically and electrically separates and spaces the receive antenna 102 from the transmit antenna 106, thereby rendering the transponder 300 electrically inactive so that it does not send a response 314 upon receipt of an interrogation 312. Thus the transponder 300 actively outputs a first response 314 prior to opening the product package 302, and passively outputs a second response (i.e., no active response) after opening the product package 302, where the first response is different than the second response.

Figure 5:
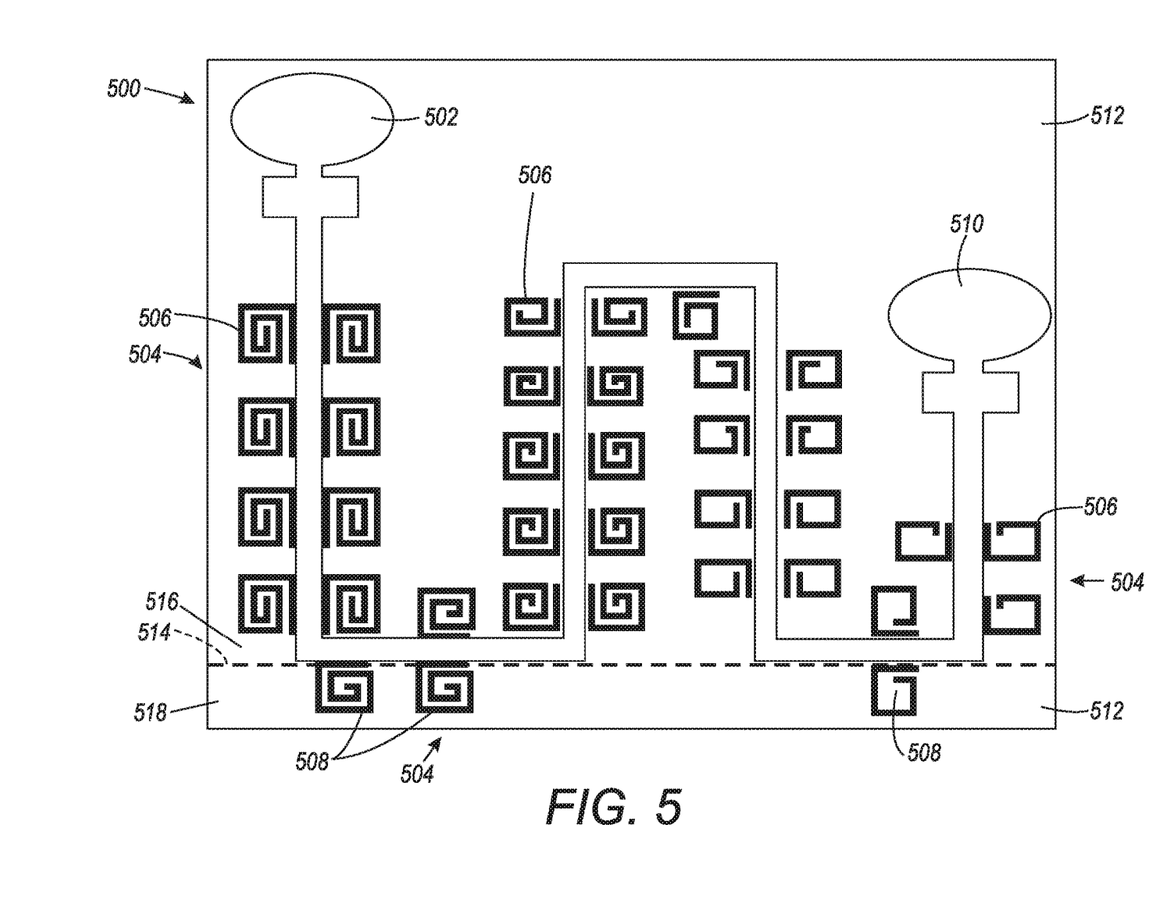
FIG. 5 is a plan view of another RFID tag in accordance with the present teachings.

FIG. 5 depicts another transponder 500 according to the present teachings. This embodiment includes a receive antenna 502, a multiresonator 504 including a plurality of first resonators 506 and a plurality of second resonators 508, and a transmit antenna 510, all formed on a carrier 512. The carrier 512 includes a shear-sensitive zone 514, for example, a perforation, a thinned region, or another type of shear-sensitive zone that allows a first carrier portion 516 to be more easily physically separated from a second carrier portion 518 along the shear-sensitive zone 514.

As depicted in FIG. 5, the plurality of first resonators 506, the receive antenna 502, and the transmit antenna 510 are formed and positioned on the first carrier portion 516. Additionally, the plurality of second resonators 508 are formed and positioned on the second carrier portion 518.

During use, the transponder 500 is placed onto a product as described above. Prior to opening the product or package, an interrogation 312 (FIG. 3) output from an interrogator 310 is received by the receive antenna 502. In response, the transponder 500 outputs a first response from the transmit antenna 510. When the product or package is opened, the carrier 512 separates along the shear-sensitive zone 514, thereby physically and electrically separating the first carrier portion 516 from the second carrier portion 518. This separation also physically and electrically separates the plurality of second resonators 508 from the remainder of the transponder 500. However, in contrast to the transponder of FIG. 3, the separation does not electrically disable the functionality of the transponder 500, but alters the response of the transponder 500 to an interrogation. Separating the first carrier portion 516 from the second carrier portion 518 removes only the plurality of second resonators 508 from the multiresonator 504, while the plurality of first resonators 506 remain electrically active and viable. Electrically disabling the plurality of second resonators 508, however, alters the response output by the remainder of the transponder 500. Thus the transponder 500 of FIG. 5 actively responds to an interrogation with a first response prior to opening the product, and actively responds to an interrogation with a second response after opening the product or package, where the first response is different than the second response.

While FIG. 5 depicts three second resonators 508 on the second carrier portion 518, it will be appreciated that the second carrier portion may also include only one, two, or more than three second resonators 508.

Figure 6:
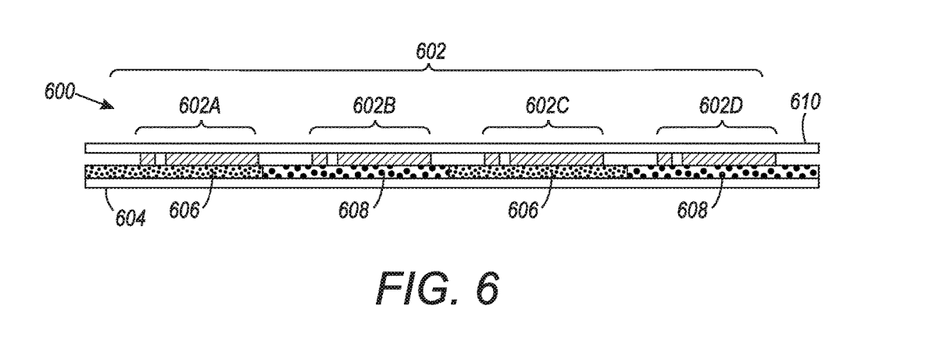
FIG. 6 is a cross section along resonators of an RFID tag during use in a sealed product or product package according to the present teachings.

FIG. 6 is a cross section depicting detail of another transponder 600 according to the present teachings. FIG. 6 depicts a cross section across multiresonator 602, including a first resonator 602A, a second resonator 602B, a third resonator 602C, and a fourth resonator 602D. The multiresonator 602 may be formed and positioned on a carrier 604 that provides a substrate for the other structures of the transponder 600. The resonators 602A-602D are selectively attached to the carrier 604 by either a first adhesive 606 or a second adhesive 608, where the first adhesive 606 is different than the second adhesive 608.

In an embodiment, the first adhesive 606 may have a higher resistance to separation from either the carrier 604 or the material of the multiresonator 602, or both, than the second adhesive 608. In other words, the first adhesive may have a higher adhesive strength or adhesion than the second adhesive. In an embodiment, the first adhesive 606 may be, for example, one or more of a cyanoacrylate such as methyl 2-cyanoacrylate, ethyl-2-cyanoacrylate, n-butyl cyanoacrylate, 2-octyl cyanoacrylate, or another suitable relatively higher-strength adhesive. In an embodiment, the second adhesive 608 may be, for example, one or more of a natural rubber adhesive, a synthetic rubber adhesive, a urethane rubber such as a urethane rubber-based adhesive or a polyurethane rubber adhesive, or another suitable relatively lower-strength adhesive. One or both of the first adhesive and the second adhesive may be an air-curable adhesive, a heat-curable adhesive, an adhesive curable using ultraviolet light (i.e., a UV-curable adhesive), or an adhesive that is cured using another suitable process. The transponder 600 further includes a support layer or support film 610 physically attached to the multiresonator 602. The support film 610 is positioned opposite the carrier 604, and the plurality of resonators 602A-602D are positioned directly between the carrier 604 and the support film 610. The support film 610 may be, for example, biaxially oriented polypropylene or another suitable material. The support film 610 may be attached to the multiresonator 602 using an adhesive (not individually depicted for simplicity). In an embodiment, a strength of attachment between the support film 610 and the plurality of resonators 602A-602D is less than the strength of attachment of the first adhesive 606, and greater than the strength of attachment of the second adhesive 608. In another embodiment, the support film 610 may be physically attached to the second resonator 602B and the fourth resonator 602D, and not attached to either the first resonator 602A or the third resonator 602C. Other embodiments are contemplated.

Figure 7:
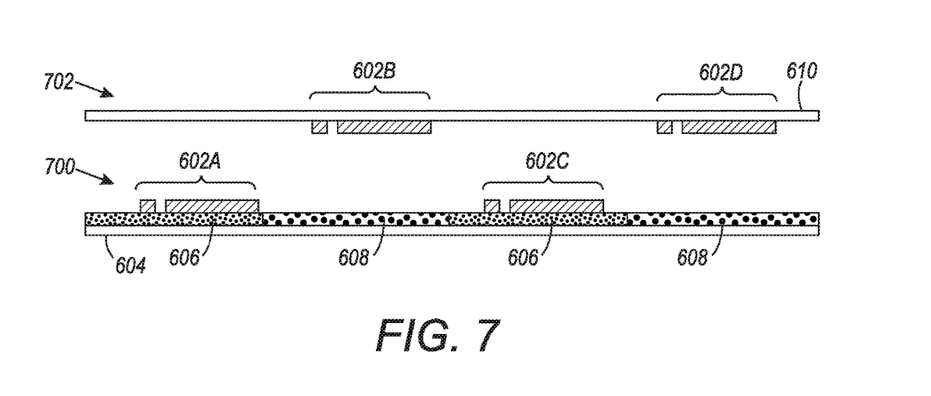
FIG. 7 is a cross section of the FIG. 6 structure after unsealing or opening the product or product package.

FIG. 6 depicts the assembled transponder 600 prior to opening a package. In the FIG. 6 form, each resonator 602A-602D of the multiresonator 602 may be electrically interposed between, and electrically coupled with, a receive antenna and a transmit antenna, similar to the receive antenna 502 and the transmit antenna 510 depicted in FIG. 5, for example. In the FIG. 6 form, each resonator 602A-602D is able to contribute to a response to an interrogation. Once the package is opened, the support film 610 and resonators 602B, 602D separate from the remainder of the transponder 600 as depicted in FIG. 7. A first portion 700 of the transponder 600 includes resonators 602A, 602C, the carrier 604, as well as the receive antenna and the transmit antenna (not individually depicted for simplicity). A second portion 702 of the transponder 600 includes resonators 602B, 602D and the support film 610. In the FIG. 7 form, the transponder first portion 700 actively outputs a response to an interrogation using resonators 602A, 602C to contribute to the response, while the resonators 602B, 602D have been removed from the electrically active portion of the transponder 600. Thus, in the FIG. 6 form, the transponder 600 outputs a first active response to an interrogation. In the FIG. 7 form, the transponder 600, and more particularly the first portion 700 of the transponder 600, outputs a second active response to an interrogation, wherein the first active response is different than the second active response. The first response to an interrogation suggests the package seal remains intact, while the second response to an interrogation suggests the package seal has been broken.

Figure 8:
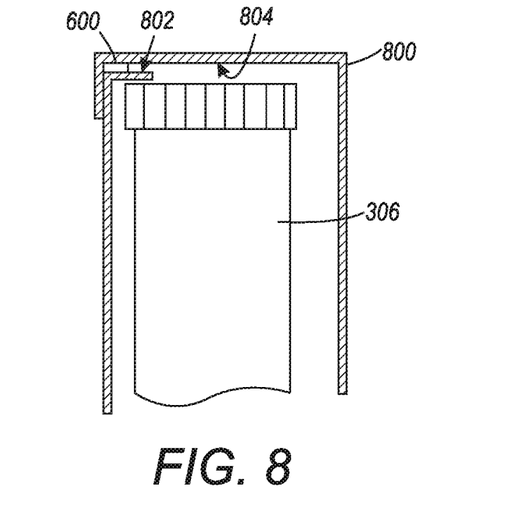
FIG. 8 is a side view of the FIG. 6 structure during use.

FIGS. 8 and 9 depict the transponder 600 during use with a product 800. In FIG. 8, the product 800 is unopened and has an intact seal. The carrier 604 (FIG. 6) is attached to a first surface 802 of the product 800, while the support film 610 is attached to a second surface 804 of the product 800, where the second surface 804 is opposite the first surface 802. In FIG. 8, the transponder 600 is in the FIG. 6 form. Each resonator 602A-602D of the multiresonator 602 is electrically coupled between the receive antenna and the transmit antenna, and contributes to a response to an interrogation.

Figure 9:
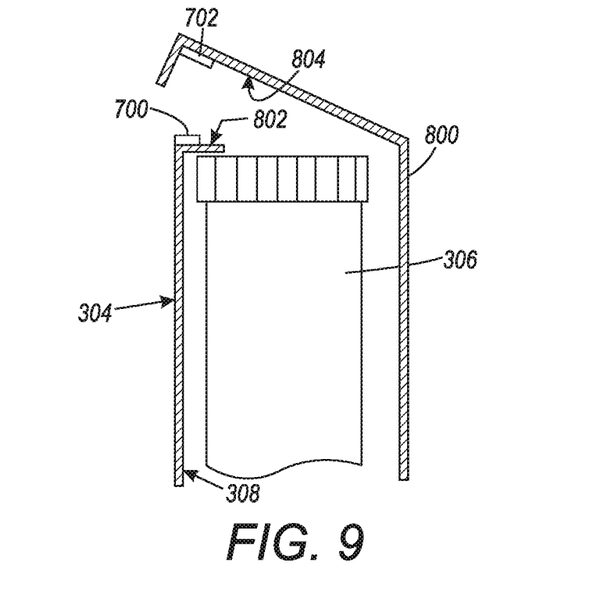
FIG. 9 is a side view of the FIG. 7 structure during use.

In FIG. 9, the product 800 has been opened and the seal has been broken. The transponder 600 is in the FIG. 7 form, and includes a first portion 700 and a second portion 702, where the second portion 702 has been physically and electrically separated from the first portion 700. The carrier 604 (FIG. 6) remains attached to a first surface 802 of the product 800 and the support film 610 remains attached to a second surface 804 of the product 800. Resonators 602B, 602D have been electrically and physically separated from the transmit antenna, the receive antenna, and resonators 602A, 602C. Only resonators 602A and 602C of the multiresonator 602 are electrically coupled between the receive antenna and the transmit antenna, and contribute to a response to an interrogation.

Thus, in the embodiment of FIGS. 8 and 9, the transponder 600 outputs a first response to an interrogation in the unopened FIG. 8 position, and outputs a second response to an interrogation in the opened FIG. 9 position, where the second response is different to the first response. If the transponder 600 returns the first response to an interrogation, it can be assumed that the product 800 remains unopened and the seal remains intact. If the transponder 600 returns the second response to an interrogation, it can be assumed that the product 800 has been opened and the seal is broken.

Figure 10:
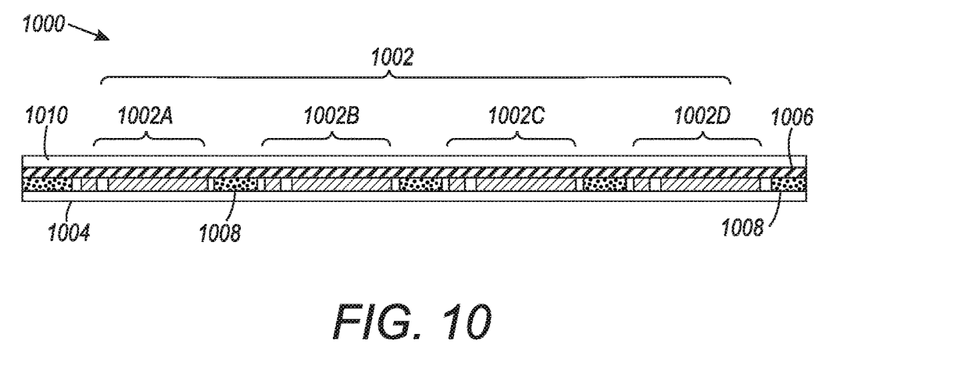
FIG. 10 is a cross section along resonators of an RFID tag during use in a sealed product or product package according to the present teachings.

FIG. 10 is a cross section depicting detail of another transponder 1000 according to the present teachings. FIG. 10 depicts a cross section across multiresonator 1002, including a first resonator 1002A, a second resonator 1002B, a third resonator 1002C, and a fourth resonator 1002D. The multiresonator 1002 may be formed and positioned on a carrier 1004 that provides a substrate for the other structures of the transponder 1000. The resonators 1002A-1002D may be attached to the carrier 1004 by an adhesive (not depicted for simplicity).

The transponder 1000 further includes an electrically conductive layer 1006 that physically and electrically contacts each of the plurality of resonators 1002A-1002D, and electrically shorts each resonator 1002A-1002D together. The electrically conductive layer 1006 may be, for example, a metal or metal alloy, such as an aluminum layer, a copper layer, or another suitable electrically conductive material. The transponder 1000 may include an adhesive 1008 that removably attaches the electrically conductive layer 1006 to the carrier 1004 and maintains the electrically conductive layer 1006 in physical contact with the multiresonator 1002. In another embodiment, the adhesive may be or include an electrically conductive adhesive such as a conductor-filled polymer that physically and electrically attaches the electrically conductive layer 1006 directly to each resonator 1002A-1002D. The electrically conductive layer 1006 may be attached to a support layer 1010 as depicted.

FIG. 10 depicts the transponder 1000 when the tamper-evident seal is in a sealed state. The electrically conductive layer 1006 electrically shorts each resonator 1002A-1002D together. In the sealed position of FIG. 10, the multiresonator 1002 does not respond to an interrogation, for example, because the resonation of each of the resonators 1002A-1002D is dampened or prevented when the electrically conductive layer 1006 is in the sealed position of FIG. 10. In use as a tamper-evident seal on a package, the transponder 1000 in the FIG. 10 sealed position may appear similar to transponder 600 of FIG. 8.

Figure 11:
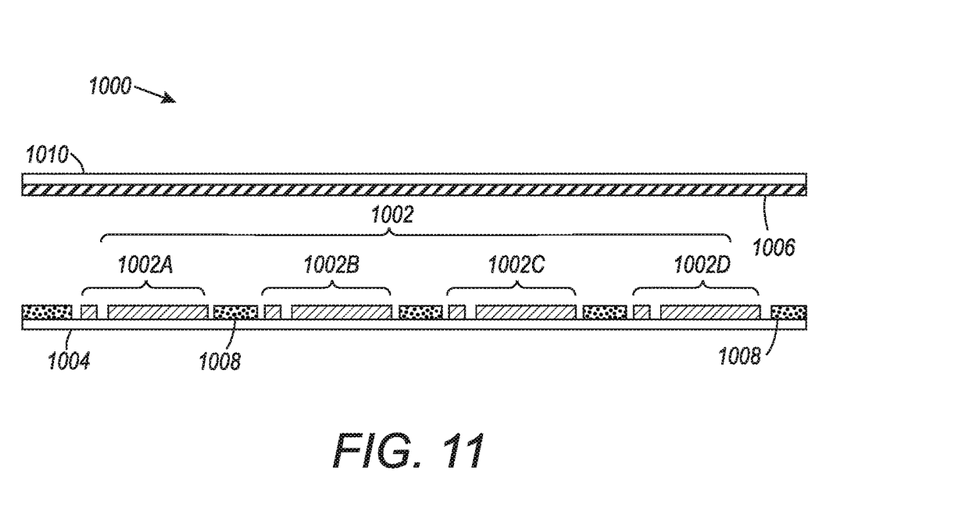
FIG. 11 is a cross section of the FIG. 10 structure after unsealing or opening the product or product package.

FIG. 11 depicts the transponder 1000 after the package seal is in the unsealed state. The electrically conductive layer 1006 no longer physically and electrically contacts the plurality of resonators 1002A-1002D. In the unsealed position of FIG. 11, the transponder 1000 emits a response to an interrogation. In use as a tamper-evident seal on a package, the transponder 1000 in the FIG. 11 unsealed position may appear similar to transponder 600 of FIG. 9. In an embodiment, the adhesive 1008 may remain attached to the carrier 1004 as depicted, and/or to the electrically conductive layer 1006. Further, the adhesive 1008, such as an electrically conductive adhesive, may remain attached to one or more of the resonators 1002A-1002D if the adhesive does not adversely affect the ability of the multiresonator 1002 to resonate or emit a signal in reply to an interrogation.

In one use of this embodiment, an interrogation may be issued to many sealed packages by an interrogator at once, for example, a plurality of sealed packages that are stored together within a container such as a shipping container or carton. If none of the packages have a broken seal, no reply from any of the sealed packages is received by the interrogator. If one or more of the packages have a broken seal, a reply is received by the interrogator. Thus this embodiment may provide a technique for easily sensing a plurality of sealed packages at once, and determining whether one or more of the packages of the plurality of packages has a broken seal.

Thus the transponder 1000 passively outputs a first response (i.e., no active response) prior to opening the product package, and actively outputs a second response after opening the product package, where the first response is different than the second response. In this embodiment, the portion of the transponder that is removed from the multiresonator 1002 may be referred to as an overlay. In the embodiment of FIG. 11, the overlay includes the electrically conductive layer 1006 and the support layer 1010.

An embodiment of the present teachings thus includes a chipless RFID tag as a tamper-proof or tamper-evident indicator. In one mode of use, for example the embodiment of FIGS. 3 and 4, the RFID tag may be partially destroyed when tampered with and/or when a package seal is breached or broken. This results in a loss of a signal or response to an interrogation that signifies tampering. In other words, the RFID tag outputs an active first response when the tamper-evident indicator in a sealed state and outputs a passive second response (i.e., no response) when the tamper-evident indicator is in an unsealed state. In another mode of use, for example the embodiment of FIGS. 8 and 9, the RFID tag returns an active first signal in response to an interrogation when the package is sealed and returns an active second signal that is different from the first signal after the package seal has been breached or broken. In another mode of use, for example the embodiment of FIGS. 10 and 11, the RFID tag returns a passive first response (i.e., no response) when the tamper-evident indicator is in a sealed state and returns an active second response when the tamper-evident indicator is in an unsealed state. The presence of an RFID signal results from when a conductive overlay of the RFID tag is disrupted, for example by removing the coverlay, enabling the RFID tag to output an active signal and to be detected by an active second signal in response to an interrogation. In each of the embodiments, the chipless RFID tag is significantly cheaper than, for example, an active RFID tag that includes an integrated circuit and/or discrete active electronic components. An RFID transponder as described herein may be implemented at the item level, carton level, or pallet level.

The FIGS. herein depict various exemplary structures, and an actual device design may include other features that have not been depicted for simplicity, while various depicted features may be removed or modified.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. As used herein, the term "one or more of" with respect to a listing of items such as, for example, A and B, means A alone, B alone, or A and B. The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. Finally, "exemplary" indicates the description is used as an example, rather than implying that it is an ideal. Other embodiments of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

The invention claimed is:
1. A tamper-evident seal, comprising:
    a radio frequency identification (RFID) transponder comprising a carrier and a plurality of resonators positioned over the carrier, the plurality of resonators being electrically interposed between, and electrically coupled with, a receive antenna and a transmit antenna, the RFID transponder being a chipless transponder;

a support film attached to at least a portion of the plurality of resonators, wherein the plurality of resonators are positioned directly between the support film and the carrier, the support film configured to be physically and electrically separated from the carrier;

a first portion of the plurality of resonators being configured to remain attached to the carrier after physically and electrically separating the support film from the carrier, and a second portion of the plurality of resonators being configured to remain attached to the support film after physically and electrically separating the support film from the carrier;

a first adhesive having a first adhesive strength that physically attaches the first portion of the plurality of resonators to the carrier, and a second adhesive having a second adhesive strength that physically attached the second portion of the plurality of resonators to the carrier, wherein the first adhesive strength is higher than the second adhesive strength, the first adhesive comprises one or more of a cyanoacrylate, methyl 2-cyanoacrylate, ethyl-2-cyanoacrylate, n-butyl cyanoacrylate, and 2-octyl cyanoacrylate, and the second adhesive comprises one or more of a natural rubber adhesive, a synthetic rubber adhesive, a urethane rubber, a urethane rubber-based adhesive, and a polyurethane rubber adhesive;

the RFID transponder being configured to output a first response to an interrogation when the tamper-evident seal is in a sealed state; and the RFID transponder being configured to output a second response to an interrogation when the tamper-evident seal is in an unsealed state, the second response being different than the first response.

2. The tamper-evident seal of claim 1, wherein the RFID transponder is configured to remain functional and outputs an active second response after the carrier is physically and electrically separated from the support film.

3. The tamper-evident seal of claim 1, further comprising:

a first surface of a product, wherein the carrier is positioned on, and physically attached to, the first surface of the product; and a second surface of the product, wherein the support film is positioned on the second surface of the product and the carrier is configured to physically and electrically separate from the support film when the first surface is moved relative to the second surface.

4. The tamper-evident seal of claim 3, wherein the first surface is a first interior surface of the product and the second surface is a second interior surface of the product.

* * * * *